Jan. 16, 1968 J. B. ULAM 3,363,307
METHOD OF MAKING ELECTRICALLY HEATED COOKING VESSELS
Filed April 8, 1963

INVENTOR
John B. Ulam
his Attorneys 3,363,307
**METHOD OF MAKING ELECTRICALLY
HEATED COOKING VESSELS**
John B. Ulam, Canonsburg, Pa., assignor to Composite Metal Products, Inc., a corporation of Pennsylvania
Filed Apr. 8, 1963, Ser. No. 271,374
9 Claims. (Cl. 29—488)

This invention relates to a method of making electrically heated cooking vessels and particularly to a method of making electrically heated cooking vessels from clad metal units such as double armor stainless clad aluminum and similar clad metals.

For a number of years, the problem of making a satisfactory electrically heated cooking vessel from clad metal stock has intrigued the industry but has remained without a satisfactory solution. The cooking vessel industry has been searching for a metal having high-thermal conductivity, having external surfaces which are resistant to corrosion and stain and having a wettable surface for brazing the heating element to the vessel. Many attempts have been made to obtain such a vessel and particularly to obtain a stainless clad aluminum core vessel without any significant success.

The prior processes of forming stainless clad cooking vessels generally fall into four categories: First, those processes which require the drawing of a stainless steel shell and then the casting of aluminum into the shell with a heating element embedded into it. Second, those processes which require drawing a stainless steel shell and then forging a slug of aluminum onto the bottom of the shell to unite the aluminum to the stainless steel and exposing the entire undersurface of aluminum after which the heating element is brazed to the bottom of the pan. This practice provides only one surface covered with stainless steel. Third, a stainless steel shell is drawn and then placed in a die casting machine after which an aluminum casting with the heating element is cast around the stainless steel shell. This practice, like the second, has only one surface coated with stainless. The fourth method is to use a stainless steel clad aluminum which is clad on one side only from which to form the vessel and to form such vessel with the stainless steel on the interior and to braze the heating element onto the uncoated aluminum forming the outside of the shell. Again, this form and practice leaves an exposed layer of aluminum on the entire bottom side of the vessel.

Since it is the object of industry to produce an electric cooking vessel which is entirely encased in stainless steel, these prior art practices except for the first method are obviously unsatisfactory because only one surface is coated. In the case of the practice in the first method above described in which the aluminum is cast into an already drawn stainless shell, certain shortcomings have become evident. In this practice, a heat dam is created by the lack of thermal-conductivity of the stainless shell; the spread of heat is restricted only to the bottom where the aluminum casting is attached and finally corrosion problems exist where excess heat is concentrated.

The great problem facing the production of a stainless coated aluminum core electric cooking vessel lies in the attachment of the heating element to the bottom surface. Brazing of stainless steel to aluminum is virtually impossible because of the intermetallic compounds that are formed by the migration of iron into the aluminum. Practice has shown that the only consistent results in the brazing of a heating element to a cooking vessel is obtained when the aluminum sheathed element is brazed to an aluminum surface.

I have discovered a method of making a cooking vessel from double armor stainless clad aluminum which overcomes the problems which have faced the prior art and provides the necessary and desired stainless coating over both the interior and exterior of the vessel and makes possible the brazing of aluminum sheathed heating element directly to the aluminum core of the vessel.

In the preferred practice of my invention, I form a shell of stainless clad aluminum of the double armor type into the desired shape of a vessel. A light machine cut is made on the bottom of the vessel over the area to which the aluminum sheathed heating element is to be attached. The exposed surface is cleaned and fluxed. A brazing alloy is placed over the cleaned fluxed aluminum surface. A heating element sheathed in aluminum is placed on the fluxed surface and the entire vessel assembly is heated to brazing temperature. The stainless steel may be removed from the desired area of the heating coil on the bottom of the vessel by machining the area in its entirety or, alternatively, a very narrow cut around the periphery may be made exposing the aluminum and the stainless steel to be removed may be peeled away exposing a raw aluminum surface to which the braze may be attached.

In the foregoing general statement, I have set out certain objects, advantages and purposes of my invention. Other objects, advantages and purposes will become apparent from the following description of the accompanying drawings in which, FIGURE 1 is an isometric view of a vessel which has been drawn from double armor stainless clad aluminum;

Figure 1:
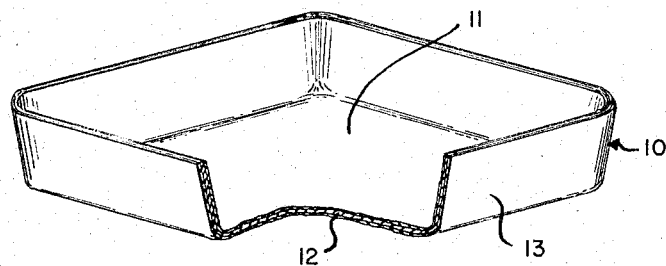
Figure 2:
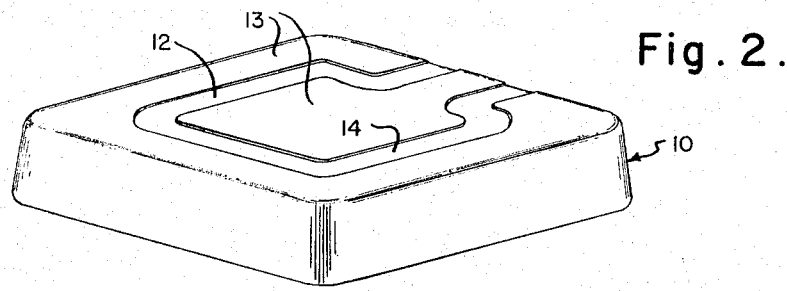
FIGURE 2 shows the vessel of FIGURE 1 with a portion of the stainless removed.
Figure 3:
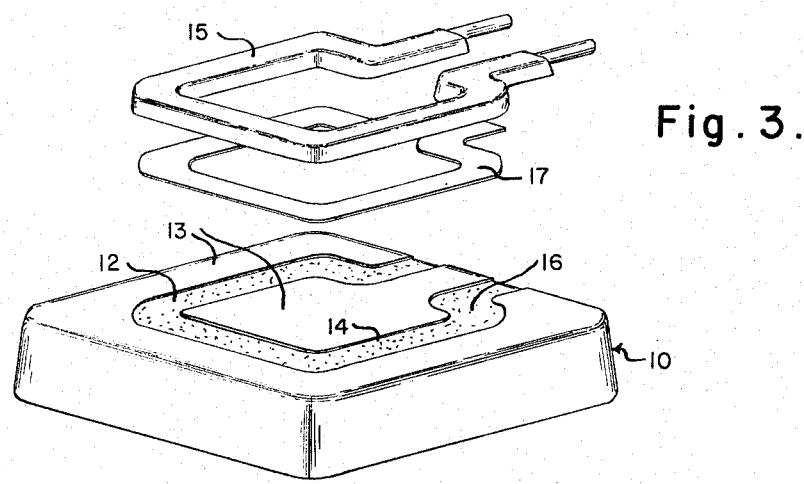
FIGURE 3 shows the vessel of FIGURE 2 with the components making up the heating unit and vessel in exploded relationship.
Figure 4:
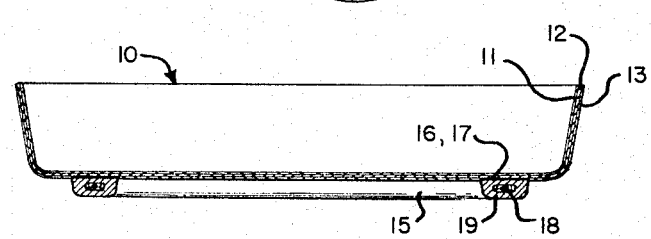
FIGURE 4 is a section through a vessel assembled according to my invention.

Referring to the drawings, I have illustrated a vessel 10 which has been deep drawn from a double armor stainless clad aluminum having an upper stainless member 11, an aluminum core 12 and a bottom stainless member 13. A section 14 is removed from the bottom surface 13 of the vessel by machining an area equal to the area of heating element assembly 15 to be attached. The resulting machine surface is coated with a flux 16 and with a brazing metal 17 and the heating element assembly 15, made up of the heating element 18 sheathed in an aluminum coating 19, is placed in position on the flux and brazing metal. The heating element assembly 15 is brazed by passing the assemblage through a heating zone at a sufficiently high temperature to melt the brazing compound but at a temperature sufficiently low to prevent melting of the aluminum. This provides a vessel which has an aluminum core in direct contact with the heating element through the aluminum sheath so that there is uniform distribution of the heat throughout the vessel and the entire exterior surface of the vessel outside of the heating element is covered by the layers of stainless steel originally bonded to the aluminum core. This practice provides the necessary external corrosion resistance over substantially the entire body of the vessel while at the same time providing the necessary uniform heat conductivity throughout the body of the vessel. Since the vessel itself is made of an aluminum core which is stainless clad on both sides prior to forming it has a metal-to-metal surface interface which provides the maximum heat conductivity.

It is of course obvious that this technique could be applied to vessels having a copper core and stainless steel outer layers, or an ordinary iron core and stainless steel outer layers or to any other combination of clad metals. It is also obvious that this technique can be applied to heating units in the form of a disc, rectangle or other geometric form by exposing an appropriate section of the core. For example in the case of a disc, a light machine cut over the entire center surface of the bottom of the vessel removing a disc shape section of stainless corresponding to the disc shape of the heating element might be used.

While I have illustrated and described certain preferred embodiments of my invention, it will be understood that this invention may be otherwise variously practiced within the scope of the following claims.

I claim:

1. A method of forming an electrically heated cooking vessel comprising the steps of forming a vessel from a sheet of aluminum coated on both sides with sheets of stainless steel, removing from the bottom surface of said vessel a sufficient amount of stainless steel to expose the aluminum core over the area to be covered by a heating element, encasing the heating element in an aluminum sheath, applying a layer of brazing metal between the sheath and the exposed aluminum of the cooking vessel and heating to braze the element to the exposed aluminum.

2. A method of forming an electrically heated cooking vessel comprising the steps of forming a vessel from a formed sheet of aluminum coated on both sides with sheets of stainless steel, cutting an outline through the stainless steel sheet on the bottom surface of said vessel substantially identical to that of a heating element assembly, removing the stainless steel within said outline to expose the aluminum core over the area to be covered by a heating element, encasing the heating element in an aluminum sheath, applying a layer of brazing metal between the sheath and the exposed aluminum of the cooking vessel and heating to braze the element to the exposed aluminum.

3. A method of forming an electrically heated cooking vessel comprising the steps of forming a vessel from a sheet of aluminum coated on both sides with sheets of stainless steel, removing from the bottom surface of said vessel an area of stainless steel substantially equivalent to that of a heating element assembly to expose the aluminum core over the area to be covered by said heating element assembly, encasing a heating element in an aluminum sheath to form a heating element assembly, applying a layer of brazing metal between the sheath and the exposed aluminum of the cooking vessel and heating to braze the element to the exposed aluminum.

4. A method of forming an electrically heated cooking vessel comprising the steps of forming a vessel from a sheet of aluminum coated on both sides with sheets of stainless steel, removing from the bottom surface of said vessel a sufficient amount of stainless steel to expose the aluminum core over the area to be covered by a heating element, encasing the heating element in an aluminum sheath and applying flux and braze metal to said exposed area, placing the encased heating element assembly on said exposed area and subjecting the assembly to brazing temperature to form a layer of brazing metal between the heating element and the exposed area whereby to attach the heating element assembly to said exposed area.

5. A method of forming an electrically heated cooking vessel comprising the steps of forming a vessel from a sheet of aluminum bonded by intermolecular bonds on both sides with sheets of stainless steel, removing from the bottom surface of said vessel a sufficient amount of stainless steel to expose the aluminum core over the area to be covered by a heating element, encasing the heating element in an aluminum sheath, applying a layer of brazing metal between the sheath and the exposed aluminum of the cooking vessel and heating to braze the element to the exposed aluminum.

6. A method of forming an electrically heated cooking vessel comprising the steps of forming a vessel from a formed core sheet of aluminum coated on both sides with sheets of stainless steel, cutting an outline through the stainless steel sheet on the bottom surface of said vessel substantially identical to that of a heating element assembly, removing the stainless steel within said outline to expose the aluminum core over the area to be covered by a heating element, applying a layer of brazing metal between the heating element encased in an aluminum sheath and the exposed aluminum of the cooking vessel and heating to braze the element to the exposed aluminum.

7. A method of forming an electrically heated cooking vessel comprising the steps of forming a vessel from a sheet of aluminum coated on both sides with sheets of stainless steel, removing from the bottom surface of said vessel an area of stainless steel substantially equivalent to that of a heating element assembly encased in an aluminum sheath to expose the aluminum core over the area to be covered by said heating element assembly, applying a layer of brazing metal between the sheathed heating element assembly and the exposed aluminum of the cooking vessel and heating to braze the element to the exposed aluminum.

8. A method of forming an electrically heated cooking vessel comprising the steps of forming a vessel from a sheet of aluminum coated on both sides with sheets of stainless steel, removing from the bottom surface of said vessel a sufficient amount of stainless steel to expose the aluminum core over the area to be covered by a heating element encased in an aluminum sheath and applying flux and braze metal to said exposed area, placing the encased heating element assembly on said exposed area and subjecting the assembly to brazing temperature to form a layer of brazing metal between the heating element and the exposed area whereby to attach the heating element assembly to said exposed area.

9. A method of forming an electrically heated cooking vessel comprising the steps of forming a vessel from a sheet of aluminum bonded by intermolecular bonds on both sides with sheets of stainless steel, removing from the bottom surface of said vessel a sufficient amount of stainless to expose the aluminum core over the area to be covered by a heating element, applying a heating element encased in an aluminum sheath to the exposed core, applying a layer of brazing metal between the sheath and the exposed aluminum of the cooking vessel and heating to braze the element to the exposed aluminum.

References Cited

UNITED STATES PATENTS

| | | | |
|---|---|---|---|
| 2,841,137 | 7/1958 | Chace | 219—44 |
| 2,937,261 | 5/1960 | Jepson | 219—44 |
| 3,095,498 | 7/1963 | Foster | 219—44 |

JOHN F. CAMPBELL, *Primary Examiner*.

J. W. BOCK, *Assistant Examiner*.